Figure 1:
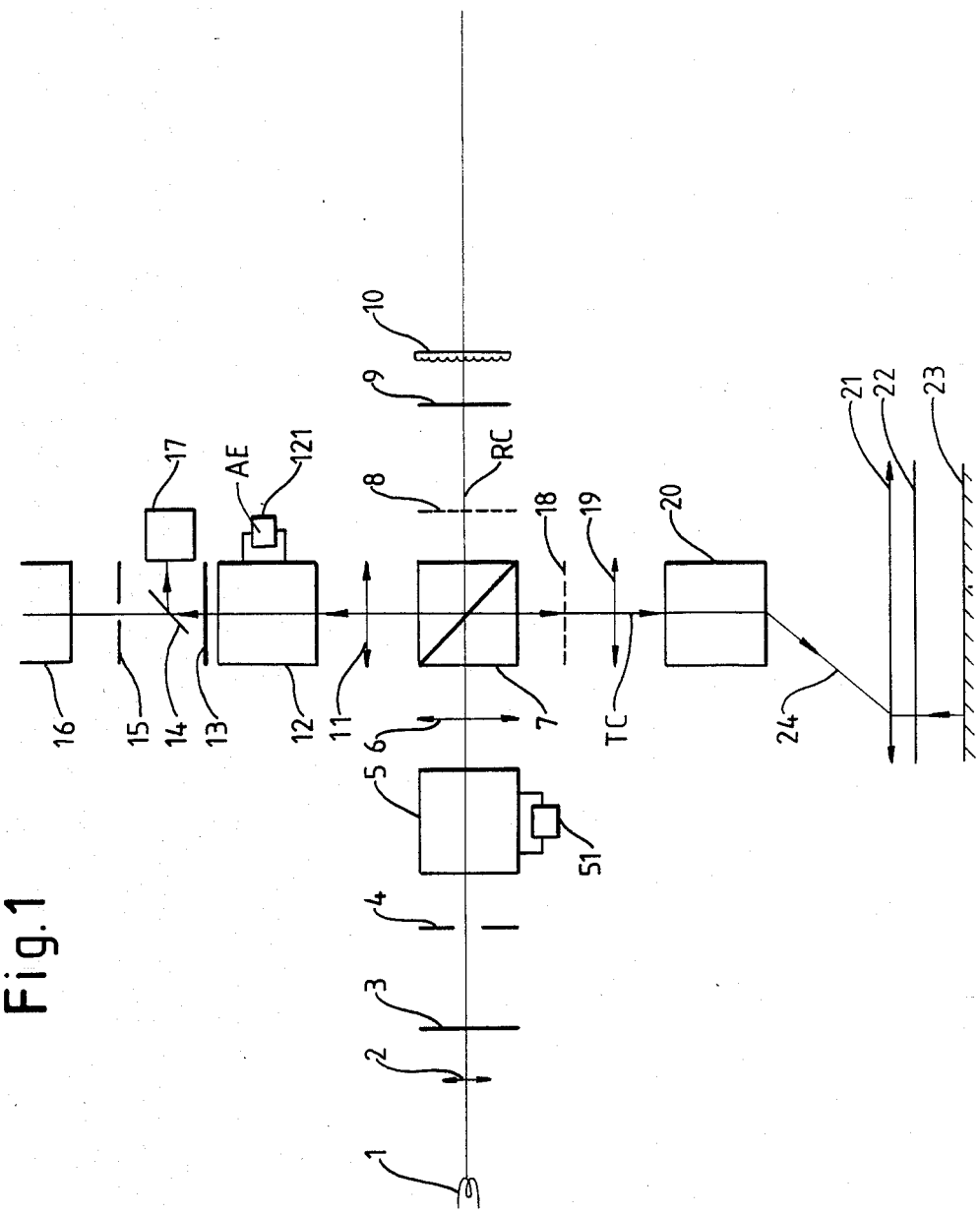

United States Patent [19]

Baker

[11] Patent Number: 4,845,356

[45] Date of Patent: Jul. 4, 1989

[54] APPARATUS AND METHOD FOR SURFACE INSPECTION WITH TEST AND REFERENCE CHANNEL COMPARISON

[75] Inventor: Lionel R. Baker, Oprington, Great Britain

[73] Assignee: Sira Limited, Chislehurst, Great Britain

[21] Appl. No.: 149,041

[22] Filed: Jan. 27, 1988

[30] Foreign Application Priority Data

Jan. 30, 1987 [GB] United Kingdom ............... 8702130

[51] Int. Cl.⁴ .................... G02F 1/01; H01J 40/14
[52] U.S. Cl. .................................. 250/225; 356/368
[58] Field of Search .............. 250/571, 572, 559, 563, 250/562, 225; 356/371, 431, 367, 368, 369

[56] References Cited

U.S. PATENT DOCUMENTS

| | | | |
|---|---|---|---|
| 3,743,431 | 7/1973 | Cushing et al. | 250/572 |
| 3,892,494 | 7/1975 | Baker et al. | 356/371 |
| 4,714,348 | 12/1987 | Makosch | 356/371 |

Primary Examiner—David C. Nelms
Assistant Examiner—Eric F. Chatman
Attorney, Agent, or Firm—Sughrue, Mion, Zinn, Macpeak & Seas

[57] ABSTRACT

Apparatus for comparing a test surface 23 with a reference surface 8 comprising detector means 16.17, a test channel TC for receiving radiation from the test surface 23 and a reference channel RC for receiving radiation from the reference surface 8. A selector means 12 is provided to pass radiation from the test channel means TC and the reference channel means RC to the detector means. Varying means 5 is provided to vary the radiation passed along the test channel TC and reference channel RC. Cycle means is provided to cycle the selector means 12 between a first state in which more radiation from the test channel TC than the reference channel RC is passed to the detector means and vice versa. Control means is provided to control the radiation varying means 5 to provide a zero or minimum variation of radiation received by the detector means as the selector means 12 is cycled.

20 Claims, 2 Drawing Sheets

APPARATUS AND METHOD FOR SURFACE INSPECTION WITH TEST AND REFERENCE CHANNEL COMPARISON

The present invention relates to an apparatus and method for surface inspection.

Measurement of the total topography of a surface requires measurement of surface form (overall features of surface shape such as bumps, and tilt) and surface texture (smaller features such as scratches and pits). The best practice, the surface under test should be compared with a reference surface such as a standard suface having known characteristics. We will describe an apparatus for measuring, by comparison with a reference or with a standard surface, the total topography including surface form, roughness, waviness and flaws. The apparatus, which is calibrated by the use of reference specimens, is normally used to measure to surfaces which exhibit some degree of specular reflection.

Previously these measurements have been carried out using a variety of separate instruments such as an interferometer or a slope detector to measure surface form and a contacting stylus (needle probe) to measure the surface texture of a surface. Optical non-contacting probes have also been used to measure surface texture. An instrument called a microscope image comparator (UK Patent No. 2,135,448) has been developed to measure the optical effect of surface flaws but will only measure defects substantially one at a time.

For inspecting large areas of a surface, laser beam scanners are used which are usually bright field open loop laser beam scanners. The main problem with conventional bright field over loop laser beam scanners, which record variations in specular reflectance over a small sampled area, is that the need for a wide bandwidth (required for the detection of small flaws) means that larger size but acceptable apparent variations in specular reflectance are also detected. This difficulty is only partially resolved by the use of a high pass electronic filter as the area near the edge of the inspected surface is then left uninspected. Using a laser power of a few milliwatts and a bandwidth of 10 MHz the dynamic range of a typical open loop inspection system would be 50:1. When high quality surfaces such as mirrors or semiconductor wafers are to be inspected for flaws and polish faults, we require a dynamic range of at least 500:). The above difficulties may apparently be resolved by the measurement of light scattered by the flaw as this approach brings about an increase in dynamic range, but at the expense of a decrease in signal level with respect to noise. Furthermore, as flaws of different types scatter over widely differing angles, the problem of collecting the scattered light becomes dominant.

Through the specification we will refer to "open loop" inspection systems and "closed loop" inspection systems.

By an open loop system we mean one in which a parameter of a test sample with respect to the same parameter of a reference sample is measured, and by knowing the value of that parameter for the reference sample, the value of the parameter for the test sample can be calculated.

In a closed loop inspection system adjustment means is provided to vary the, for example, optical, effect of the parameter being measured, whereby during the measurement, of the parameter for the test and reference sample, the adjustment means is adjusted until the (optical) effect of the test sample and reference sample are identical whereby the parameter of the test sample being measured is measured from the change in the adjustment means.

We will describe a method and apparatus for measurement of form and/or texture of a surface in which the characteristics of the surface under test are compared dynamically and in a closed loop system with a reference channel with optical characteristics which are variable over a wide range (typically $10^4:1$). A high discrimination of signal against noise may be obtained by the use of phase sensitive homodyne detection.

The present invention provides apparatus for comparing a test surface with a reference surface comprising detector means;

a test channel means for receiving radiation from the test surface;

reference channel means for receiving radiation from the reference surface;

selector means to pass radiation from the test channel means and the reference channel means to the detector means, varying means being provided to vary the radiation passed to or from at least one of the test channel means or reference channel means characterised in that cycle means is provided to cycle the selector means between a first state in which more radiation from the test channel than the reference channel is passed to the detector means and a second state in which more radiation from the reference channel than the test channel is passed to the detector means;

control means is provided to control the radiation varying means to provide a zero or minimum variation of radiation received by the detector means as the selector means is cycled by the cycle means.

Figure 2:
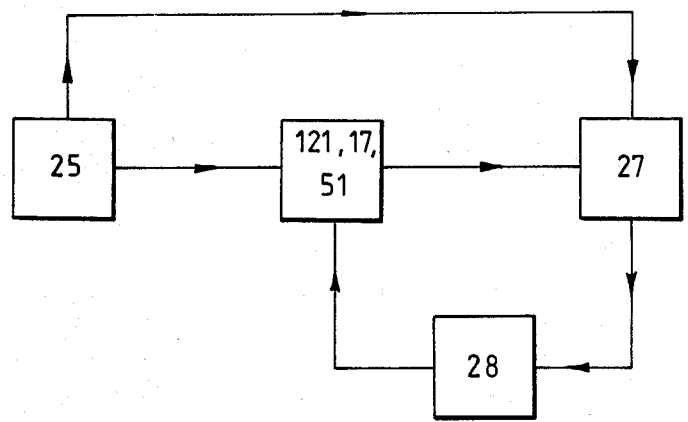

A preferred embodiment of the invention will be described with reference to the drawings in which:

FIG. 1 is a diagrammatic representation of apparatus according to the invention, and, FIG. 2 is a diagrammatic representation of the electronic circuit for processing the signal output of FIG. 1.

A schematic representation of a typical arrangement embodying the invention for inspection of wide strip products, such as film or metal strip, is shown in FIG. 1 by way of example. Smaller surfaces can be inspected by removing the scanner and using a TV camera as an image detector. The multi-channel multi-purpose instrument is capable of various modes of operation and can measure form, roughness, waviness, flaws and contamination of the surface.

A light source 1 such as a tungsten lamp is focused through a polariser 3 by a lens 2 on to a pinhole 4. If a laser is used instead of a tungsten lamp, polariser 3 is replaced by a half-wave retardation plate (to rotate the plane of polarisation) and the pinhole 4 is replaced by a single mode selector pinhole. Light from pinhole 4 passes through a plane of polarisation rotator 5 for rotation of the plane of polarisation and is rendered parallel by a lens 6 before passing into a polarising beam splitter 7. The means 5 rotates the plane of polarisation in accordance with an input electrical signal provided by control circuit 51.

The polarising beam splitter 7 passes some of the light from lens 6 into a reference channel indicated at RC on FIG. 1 and some of the light into the test channel indicated by TC on FIG. 1.

The light directly transmitted into the reference channel RC illuminates a reference graticule 8 on which, for example, a reference scratch is carried. The light passes through a quarter-wave plate 9 to a retroreflector 10 and the reflected light passes through the plate 9 again. After reflection at polarising beam splitter 7, a lens 11 focuses an image of graticule 8 on to a TV camera 16 via a second plane of polarisation rotator 12, an analyser 13, a beam splitter 14 and a spatial frequency filter 15.

A photon detector 17 (e.g. a photo multiplier) receives a portion of the light from the beam splitter 14.

The second plane of polarisation rotator 12 may be similar to the first plane of polarisation rotator 5 and is also controlled by an electrical signal from a control circuit 121; however the speed of operation and rotation of the plane of polarisation in the rotator 12 is at least ten times greater than that in the rotator 5 (for example, if the signal applied by control circuit 121 is 100 mHz the signal applied by control circuit 51 is typically 1 mHz). The plane of polarisation rotators 5 and 12 can typically rotate the plane of polarisation by ±5° about a zero point.

The choice of design of rotator 12 and means 5 depends on speed and precision of measurement needs. Electro-optic modulators employing linear electro-optical or Pockels effect, together with a quarter-wave plate, have the advantage of operation at high frequencies up to say 100 MHz but require high voltages. Faraday effect or magneto-optical modulators on the other hand have a higher stability but operate at greatly reduced frequencies up to perhaps 10 KHz.

The light reflected by polarising beam splitter 7 into the test channel TC illuminates an intermediate image plane 18 which is imaged by a lens 19 through a beam scanner 20, a collimator 21 and a quarter-wave plate 22 on to a surface 23 under test. The scanner 20 scans the beam 24 across the surface 23 under test. The scanner 20 can be a polygon mirror, oscillating galvanometer mirror or any other type of beam deflector, and may be used in combination with movement of the test surface 23, able to scan over the whole of the surface of the product to be inspected. A mechanical stop to limit the field-of-view may be placed either between light source 1 and lens 2 if a tungsten source 1 is used or it may be placed at the image plane 18 if a laser source 1 is used.

The light returned by reflection by surface 23 is reimaged via the plane 18 on to the TV camera 16. In this way an image of graticule 18 and surface 23 is, formed on TV camera 16 and the specular components from both objects are detected by detector 17. This is achieved by placing plane 18 and scanner 20 at the two focal points of lens 19, and scanner 20 and surface 23 at the two focal points of collimator 21.

The apparatus thus far described may be used in a number of different modes so as to survey the surface 23 topographically.

In general terms, the detector 17 is used in conjunction with the scanner 20 to view a small area (pixel) typically of size . . . which is scanned across the surface 23 whereas the TV camera 16 is used to examine an area typically of size . . . (large then the area viewed at any one time by the detector). However, if the scanning by scanner 20 is sufficiently slow, then the TV camera 16 can be used to effectively examine individual selected areas as the scanner 20 scans the beam 24 slowly across the surface 23.

The measurement of roughness and flaws is essentially photometric whereas the measurement of form and waviness is essentially metrological.

MODE 1

In a first mode in which a flaw of a surface is to be measured a small area (pixel) under examination (of a size which is larger than the width of the flaw is scanned across the surface 23. Light is specularly reflected from the surface 23 to the test channel TC. Although the beam 24 is scanned continuously across the surface 23, one can consider the operation of the apparatus whilst it is examining one particular small area (pixel) of the surface 23. For each small area (pixel) examined, the rotator 12 will be oscillated, for example, ten times so as to receive alternately, ten times, signals from the test channel TC and from the reference channel RC. It wiil be understood, of course, that as the rotator 12 is oscillated it varies the light received from each channel TC and RC so that during an oscillation light from channel TC increases to a maximum, whilst light from channel RC decreases to a minimum, and then light from channel TC decreases to a minimum whilst light from channel RC increases to a maximum and so on. The increases and decreases are sinusoidal.

If the light from channels TC and RC are the same, then during rotation of rotator 12, their combined light intensities (the sum of the two intensities) measured by detector 17 will remain the same even though their individual components vary. If, however, the eight from the two channels TC and RC are not identical their combined light intensities will vary as the rotator 12 rotates to give an error signal. This error signal is automatically minimised by rotating the rotator 5 by means of a signal to the control circuit 51 so as to render the light intensities from the two channels TC and RC the same. Thus for each small area (pixel) across the surface 23 a null point is produced, (that is the light signal from the test channel TC and reference channel RC are equalised) by means of rotation of the rotator 5. A measure of the extent to which the plane of polarisation of the rotator 5 has to be rotated is used to provide a measure of the particular parameter of the surface 23 under examination. This is called a "closed loop method".

This arrangement can be used to measure e.g.: a flaw on the surface 23 because the drop of intensity of light in channel TC from the surface 23 varies with the severity of the flaw of the surface 23.

During the use of the detector 17, the size of the small area (pixel) of the surface 23 which is under examination is reduced by closing down a field of view stop which may be placed between light source 1 and lens 2 to perhaps, 20 micron diameter (Not Shown). It will be understood, therefore, that in this mode of operation, the surface 23 is compared with the reference 8 for the measurement of surface flaws.

MODE 2

In a second mode of operation using the detector 17, in particular to detect roughness of the surface 23, it is essential to look at light specularly reflected from an area of the surface which is large compared with the topographic features of the surface which cause the roughness and so under these circumstances the field of view stop is opened up. If surface 23 is free of all texture, the total specularly reflected power measured by detector 17 is high and constant as the area of beam, defined by a stop at plane 18, is scanned by scanner 20 over surface 23. If the roughness varies, the specular reflectance will vary and so the output of detector 17 will vary. The size of aperture in front of detector 17 must be sufficiently small to reject scattered light and only measure specular light.

Typically, the area of surface 23 viewed in this mode of operation will be a diameter of 2 mm. Otherwise this second mode of operation to measure roughness is similar to the first mode of operation.

In both the first and second mode of operations, the output signal of detector 17 will vary. In detail, such variations can be measured to high precision in a closed loop mode by use of rotator 12 to select light alternatively from the reference channel RC and test channel TC. As already described this selection is carried out by varying the plane of polarisation passed by rotator 12 which in turn may be controlled by a high frequency AC signal (of up to 100 mHz) applied to control circuit 121. Initially polariser 3 is rotated so that the transmission of both channels RC and TC is equalised, and thus any rotation of analyser 13 (or due to rotator 12) produces no change in the output of detector 17. Thereafter it will be understood that a reduction in transmission of the test channel TC, due for example to scatter by surface 23, will however give rise to a varying output signal from 17 as analyser 13 is rotated (or rotator 12 is modulated). This error signal (which will be a signal varying at the frequency of oscillation of rotator 12) can be amplified and used to rotate polariser 3 in a direction to restore a null output signal from detector 17 or for higher precision is applied to control circuit 51 to rotate rotator 5. The amount of rotation of polariser 3 (or signal applied to rotator 5) say A, provides a value of the ratio of the transmission of the test and reference channels, namely $T_T/T_R$ according to the equation $$\frac{T_T}{T_R} = \tan^2 A$$

As already indicated, in practice, in order to carry out this process of nulling at high speed and high sensitivity, rather than mechanically rotating analyser 13 and polariser 3, the rotator 12 is fed with a suitably high carrier frequency and the output from detector 17 is rectified and fed back to control rotator 5 via control means 51.

A typical arrangement of an electronic system designed to operate in closed-loop mode as the scanning beam 24 is moved over surface 23 is shown schematically in FIG. 2. An oscillator 25 is used to provide the high frequency AC signal for circuit 121. The summer output of detector 17 is used as an error signal to feed a phase-sensitive detector 27 also energised by a signal directly from oscillator 25 at the same frequency. The demodulated output signal from detector 27 is fed back through a recording device 28 to energise rotator 5 via circuit 51. We refer to this as a "homodyne closed-loop system".

The signal fed to rotator 5 can be calibrated by replacing surface 23 by reference specimens of known Ra values made from the same material as surface 23.

To compare the first and second modes of operation, in the first mode of operation, to measure flaws on the surface we use a stop placed between light source 1 and lens 2 which produces a spot of 20 micron diameter.

In the second node of operation to measure roughness of the surface 23 it is preferred to have a beam width of beam 24 considerably larger, that is larger than the individual features which cause the roughness on the surface and so the beam 24 is typically of a diameter of 2 mm at the the surface 23. This field restriction can be provided by a pinhole at 18 or one placed between light source 1 and lens 2.

MODE 3

In a third mode of operation, using the TV camera 16, rotation of the rotators 12 and 5 is not utilized, but the polarisation effects are obtained by manual rotation of the polarisers 3 and 13. It will be understood that in this mode of operation the apparatus can be used in much the same way as in our GB Patent No. 2,135,448. Reference is made to that GB Patent as to the operation of the apparatus and it is not considered necessary, therefore, to refer to that operation in greater detail here. This mode requires calibration by standard flaws which remove a known proportion of light from a beam. These can be made conveniently be depositing metallised lines of known width on a transmitting substrate in combination with a quarter-wave plate and retroreflecting screen similar to graticule 8, quarter-wave plate 9 and retroreflector 10 but placed instead at the position normally occupied by surface 23.

It should be noted that graticule 8 is only required in this mode of operation when surface 23 and graticule 8 are imaged simultaneously on TV camera 16, operating with an extended field and the aperture at plane 18 opened up to enable the visibilities of the flaw on surface 23 and the reference flaw on graticule 8 to be compared by eye using the TV monitor. Preferably graticule 8 should be removed when measuring roughness.

Standard digital video processing can be used to improve the signal to noise ratio since rotation of the plane of polarisation at 12 or 13 by a known amount can be used to quantify signal levels at every TV pixel.

MODE 4

In a fourth mode of operation surface errors are measured. Surface errors in the form of deviations from flatness of surface 23 will cause movement of the image of pinhole 4 on detector 17 as the beam 24 is scanned by 20 across the width of surface 23. The detector 17 is a position-sensitive photo detector which produces an output signal which is linearly related to the position of a spot of light falling on its sensitive area. The position of the spot defined by an aperture at 18 falling on surface 23 is known from sensors (not shown) linked to scanner 20. From these two pieces of information (slope and position) one can integrate the slopes of surface 23 to provide the shape or form of that surface. For this measurement the plane 18 is restricted by a pinehole and the apparatus is operated in open loop mode.

The test surface 23 may also suffer from residual waviness and flaws such as scratches. Such textural defects will also scatter light from the beam 24 so that they will be seen as dark areas on the TV monitor connected to TV camera 16. By selecting the spatial frequency filter stop 15 so that the coarses scratches appear as unresolved lines or shadows on the TV monitor, analyser 13 can be rotated so that the contrast of such a test scratch equals that of a reference defect in the form of graticule 8. The relative visibility of the test and reference scratch is then equal to the tangent squared of the angular setting of analyser 13.

If a higher precision of measurement is required, the distribution of intensity across the image of a scratch can be obtained by using a small pinhole at plane 18, the image of which is scanned across surface 23 by scanner 20 and then employing polarisation rotator 12 and means 5 operating the apparatus ainding to the first or second mode of operation (homodyne closed-loop mode).

MODE 5

In a fifth mode of operation a different measurement of waviness is provided which requires an arrangement capable of converting surface undulations directly into distributions of intensity so that they may be seen and detected. This transformation process may be achieved by providing a phase contrast spatial frequency filter 15. This filter 15 which typically imposes a quarter wavelength retardation on the undiffracted component of the light, together with an absorption of 90% of light converts the undulations of surface 23 into a distribution of intensity at the plane of TV camera 16 which may be measured by a video signal line profile analyser. Once again calibration is required using a reference plate in place of surface 23 which has been previously checked by the use of a stylus instrument. By choosing the focal length of lens 19 to be greater than that of collimator 21 and by removal of scanner 20, a highly magnified view of perhaps ×1000 between surface 23 and the TV monitor screen can be readily obtained. In this phase contrast mode the system is able to measure surface undulations down to less than 1 nm (nanometer). By replacing TV camera 16 by another photon detector and field limiting pinhole, the automatic closed-loop homodyne detection system could be used to measure even smaller variations in surface height.

An alternative way to specify waviness of a surface is by means of measuring a statistical parameter known as the autocovariance function. This parameter can also be assessed using this instrument by relaying the image of pinhole 4 falling on to the plane 15 back on to TV camera 16. The Fourier transform of the distribution of intensity in this pinhole image is a measure of the autocovariance of the surface 23 at the illuminated field-of-view. An alternative way of achieving the same information is to replace pinhole 4 by a number of gratings having a sinusoidal transmission and of differing spatial periods such as might be created by two Moire type gratins when the angle between their line is varied. The variation of contrast in the image of each of these gratings as the spatial frequency is increased is a measure of the autocovariance. Its value at zero cycles/mm is a measure of specular reflectance of the surface or rms surface roughness.

Once again the measurement can be carried out with only the test channel illuminated or if high precision is required the automatic closed-loop homodyne method can be employed. In the latter case a reference surface can be used in the reference channel RC which is then configured in a similar way to the test channel TC but without the scanner 20. It will be clear that this arrangement can also be used to compare the image-forming qualities of optical systems placed in the two channels by measuring the ratio of their optical transfer functions (OTF) assuming perfect mirrors are used to retroreflect the beams back into the measuring system.

MODE 6

In a sixth mode of operation we can use the apparatus to inspect surfaces for contamination of flaws in transmission. The components of an assembled compound lens can, for example, be inspected by placing it in the region of plane 18 and focusing on each surface in turn. In this case the light in test channel TC is returned by the use of a quarter-wave plate and cat's eye reflection (i.e. reflection from a curved mirror having the focus of the lens under examination at its centre of curvature) in place of the components 19, 20, 21, 22 and 23. By the use of a pinhole aperture, opaque stop or phase contrast disk at 15 we can have a choice of bright field, dark field or phase contrast modes of viewing the surface. This choice in method of illumination enables a wide range of defects to be quantified including scratches, dust stain and other thin film and polishing defects.

Calibration in this sixth mode is carried out by the use of a special graticule in place of graticule 8 consisting of a reference compound lens similar in design to the one being tested but carrying graticule patterns of know dimensions on each of its surfaces. The surfaces of this reference lens are brought into focus simultaneously with the equivalent surface of the lens being inspected. The reference channel RC also employs a quarter-wave plate and cat's eye reflector to return the beam to B. The use of similar lenses in both channels TC and RC minimises the effects of inter-reflection between surfaces on the accuracy of measurement of a particular defect.

The invention is not restricted to the details of the foregoing examples. For example, instead of scanning the beam 24 across the surface 23, we can move the surface 23, eliminating the need for scanner 20. In open loop operation polariser 3 is rotated to a position where only the test channel TC is operating with no light available to the reference channel RC.

The choice of use of laser (and detector 17) of the TV camera (and tungsten source 1) for various modes can be understood from the following table:

|  | Form | Roughness | Waviness (Phase Contrast) | Floors (Phase Contrast and bright field) | Auto Covariance |
| --- | --- | --- | --- | --- | --- |
| (TV white light) | Yes | Yes | Yes | Yes | Yes |
| Laser | Yes | Yes | No | No | No |

The extended field (say, 2 mm diameter) is used for examining form, autocovariance and roughness.

Advantages of the apparatus described according to preferred aspects of the invention include the following:

(a) The apparatus can measure the total topography of a surface including the measurement of surface form, roughness, flaws, waviness and contamination of surfaces reflecting more than a few percent of the reflected light in the specular direction.

(b) A beam of light incident normally to the surface under test is reflected specularly back along its own path and falls either on a position-sensitive photocell 17 capable of measuring the total power in that specular component or its position in space or on to a TV camera 16 on which is focused an image of the surface formed by a lens system embodying a variable complex spatial frequency filter 15 such as that used in a phase contrast microscope. The level of absorption of this filter 15 influences the sensitivity of the measurement to surface height variations.

(c) Means are provided for varying the field-of-view (by changing the pinhole at 18) and for scanning this field over an extended area (by scanner 20). For the measurement of form or roughness the instantaneous area measured could be say 2 mm diameter at the test surface 23 which could be scanned over a field of say 1 m diameter and for this purpose, to achieve the highest sensitivity, a laser source might well be used. On the other hand, for the measurement of flaws within a selected field diameter of say 2 mm an incoherent source such as a tungsten lamp is needed to ensure the formation of an image of the flaw free of interference effects.

(d) A reference channel is provided together with means for continuously varying the balance of the amount of the light in the two channels so that the contrast of the test image can be made equal to that of the reference image. The amount of variation required to provide this null balance may be used as a measure of some aspect of the topography of the surface.

(e) Means are provided to continuously shift light from one channel to the other to determine whether the level of light in both channels is the same. Where this is carried out automatically using a high frequency driving signal from an oscillator, we refer to the method as a homodyne closed loop method.

(f) Means are provided for amplifying the error signal received from the two channels and feeding it back to adjust the balance of the two signals so as to reduce the error signal to zero and then recording the same amount of adjustment needed (which may be a measure of the topographic feature under examination).

(g) For the measurement of height profiles as requires for the measurement of waviness, a complex spatial frequency filter capable of imposing typically a quarter of a wavelength retardation on the undiffracted component of the light, together with an absorption of typically 90%, is used. This converts the phase information from the surface under test into a distribution of light intensity in the image plane which is transferred to the TV monitor screen and may be measured by means of a video signal line profile analyser.

(h) Means are provided for replacing the TV camera by a pinhole and photon detector so that distributions of intensity in the image plane, however formed, can be measured to a higher precision using the closed-loop homodyne principle of measurement.

(i) By the use of an inverted telescope the optical system can be converted into a phase contrast microscope operating in the reflection or transmission mode. Suitable design of a complex spatial frequency filter allows a wide range of structures including isolated discontinuities and distributed waviness patterns to be measured.

(j) Use of a range of calibrated specimens enables the total system to be calibrated using the comparison principle.

(k) Use of periodic test patterns imaged in autocollimation by the surface under test enables the autocovariance of the surface to be measured.

(l) Optically transmitting systems can be inspected by the use of a cat's eye reflector to return the light back through the system. Calibration is carried out by the use of graticule patterns of known dimensions on the surface of a reference lens similar to that under inspection. Any of 3 modes of illuminated including bright field, dark field and phase contrast can be employed.

We have thus described; a multichannel instrument for measuring total surface topography and surface contamination; a two channel homodyne null method of measuring very small changes in roughness or autocovariance either over an extended area or at a selected spot which can be scanned over a larger area; use of complex spatial frequency filter to convert surface ripples into a pattern of intensity proportional to the surface height at a point; use of a confocal system with scanner incorporated to enable large areas of a surface to be inspected; and use of a photometric reference channel to aid the process of system calibration using calibrated test pieces.

The apparatus has a wide variety of uses. In the engineering field it may be used in its less sensitive modes to examine the surfaces of manufactured components including, for example, castings, cylinder bores and the like, roughness and form (shape). It would be particularly useful if the detector 17 includes a position sensitive detector, such as a quadrant detector (that is a detector having four sections whereby the position of the spot of light received by the detector may be determined). In the engineering field the apparatus may be used to examine car bodies, strip products, and smaller components.

In the semi-conductor field, the apparatus may be used to inspect wafers of silicon or other materials for form (shape), roughness flaws and waviness.

In optical field, the apparatus may be used to examine laser mirrors, and examine other optical components for polish to determine when the optical component has been sufficiently polished (something which is difficult to determine by eye) and may be used to quantify surface flaws. The apparatus may also be used to examine lenses, not only for the above mentioned flaws, but also to detect dust and other contamination in surfaces or in thin film coatings.

Throughout this specification we have referred to light. Clearly the invention is not restricted to the use of optical wavelengths, but equivalent apparatus may also be used at other wavelengths, including ultra violet and infra red and within certain limits, microwaves.

I claim:

1. Apparatus for comparing a test surface with a reference surface comprising
detector means;
a test channel means for receiving radiation from the test surface;
reference channel means for receiving radiation from the reference surface;
selector means to pass radiation from the test channel means and the reference channel means to the detector means,
varying means being provided to vary the radiation passed to or from at least one of the test channel means or reference channel means
cycle means being provided to cycle the selector means between a first state in which more radiation from the test channel than the reference channel is passed to the detector means and a second state in which more radiation from the reference channel than the test channel is passed to the detector means;
control means being provided to control the radiation varying means to provide a zero or minimum variation of radiation received by the detector means as the selector means is cycled by the cycle means.

2. Apparatus as claimed in claim 1 in which the test channel means includes scanning means to scan the part of the test surface under examination across the test surface;

3. Apparatus as claimed in claim 1 or 2 in which said cycle means is operable so as to cause the selector means to pass through at least one cycle for each predetermined area of the test surface as the test surface is scanned.

4. Apparatus as claimed in any one of claims 1 to 3 in which the selector means comprises a polariser, the polarisation of which is variable by the cycle means.

5. Apparatus as claimed in claim 4 in which the cycle means is adapted to rotate the polariser back and forth through a small angle.

6. Apparatus as claimed in claims 1 to 5 in which the varying means comprises a variable polariser.

7. Apparatus as claimed in any one of claims 1 to 6 in which a polarising beam splitter is provided to pass radiation from the reference channel means and test channel means to the detector.

8. Apparatus as claimed in any one of claims 1 to 7 in which the control means is adapted to receive a signal from the detector and operates in a feedback mode to control the radiation varying means to provide a null or minimum variation in the signal from the detector means as the selector means is cycled.

9. Apparatus as claimed in any one of claims 1 to 8 in which a spatial frequency filter is mounted so that the detector means receives radiation from the reference channel means and the test channel means via said filter, said filter imposing a fractional wavelength retardation on the undiffracted component of the radiation received, absorbing a high proportion of the radiation.

10. Apparatus as claimed in claim 9 in which the spatial frequency filter is a phase contrast spatial frequency filter.

11. Apparatus as claimed in claim 9 or 10 in which there is also provided a field limiting pinhole.

12. Apparatus as claimed in any one of claims 9 or 10 in which the radiation is provided by a radiation source and a pinhole is placed adjacent to said source, the image of the pinhole being passed to the filter and means being provided to provide a Fourier transform of the distribution of intensity of the pinhole image to provide a measure of the autocovariance of the test surface.

13. Apparatus as claimed in any one of claims 1 to 8 in which the detector means comprises a position sensitive detector.

14. Apparatus as claimed in any one of claims 1 to 8 in which means are provided for varying the area of the test surface under examination.

15. Apparatus as claimed in any one of claims 1 to 8 in which the test surface includes a scratch, and the distribution of intensity across the image of the scratch is obtained by providing a small pinhole in the test channel and scanning the image of the pinhole across the scratch on the test surface.

16. Apparatus as claimed in any one of claims 1 to 15 in which to the test surface is opaque to the radiation and the detector means receives radiation reflected from the test surface.

17. Apparatus as claimed in any one of claims 1 to 15 in which the test surface is transparent to the radiation and the detector means receives radiation transmitted through the test surface and retroreflected back through the test surface.

18. Apparatus as claimed in anyone of claims 1 to 17 in which the selector means and varying means comprise electro-optic modulators.

19. Apparatus as claimed in any one of claims 1 to 17 in which the selector means and varying means comprises Faraday effect modulators.

20. Apparatus as claimed in any one of claims 1 to 17 in which the selector means and the varying means comprise magneto optical modulators.

* * * * *